May 19, 1964 R. F. BRADY 3,133,501
AIR CONTROL FOR HYDROPNEUMATIC SYSTEM
Filed Oct. 23, 1961

INVENTOR.
RICHARD F. BRADY
BY
Lockwood, Woodard, Smith & Weikart
Attorneys

United States Patent Office 3,133,501
Patented May 19, 1964

3,133,501
AIR CONTROL FOR HYDROPNEUMATIC SYSTEM
Richard F. Brady, Muncie, Ind., assignor to Brady Air Controls, Inc., Muncie, Ind., a corporation of Indiana
Filed Oct. 23, 1961, Ser. No. 146,823
9 Claims. (Cl. 103—6)

This invention relates to an air-volume control system or mechanism that is primarily adapted for incorporation in a hydropneumatic water supply system.

In the use of a hydropneumatic water supply system, it is desirable that air supplying means be provided for maintaining the amount of air in the water tank at a sufficient volume so that the pump is not operated with relatively short periods between operation. It can be appreciated that if the volume of air within the tank is relatively small, a small change in the amount of water within the tank will cause a relatively great change in the pressure within the small volume of air. It is also desirable that the air supplying means automatically cease supplying air when the proper amount of air has been delivered to the tank and not interfere with water being drawn from the tank.

According to this invention, a novel mechanism is associated with the hydropneumatic system for the purpose of supplying air and also maintaining a proper proportion of air and water in the system.

One object of the present invention is to provide an improved air-volume control for a hydropneumatic water supply system.

Still a further object of the present invention is to provide a control of this type which is relatively inexpensive and simple in construction, yet is efficient in operation.

Briefly described, the control of the present invention comprises a water level indicating tube coupled to the side of the tank at a location where it can sense whether or not water within the tank has risen to a level covering the tube. When water has risen to such a level, the mechanism of the control opens a check valve which permits air from the outside to be drawn into a water jet within the control according to the Venturi principle.

The full nature of the invention will be understood from the accompanying drawings and the following description and claims.

Figure 1:
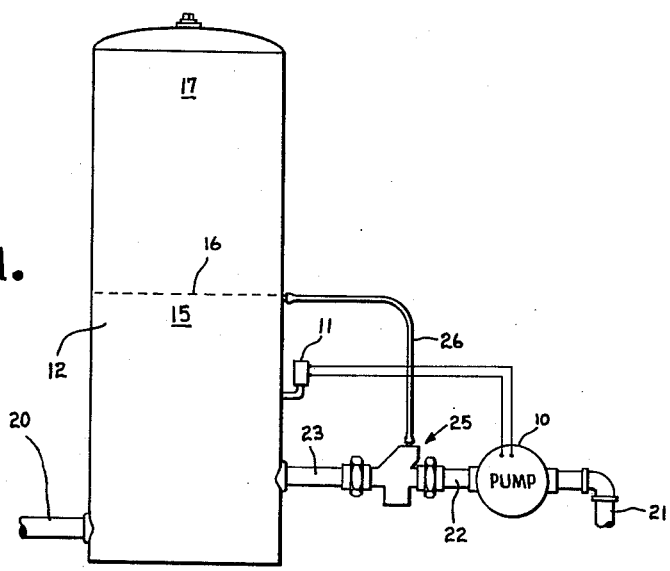
FIG. 1 is a schematic diagram of a hydropneumatic water supply system embodying the present invention.

Referring more particularly to the drawings, there is illustrated a hydropneumatic water supply system including a conventional water pump 10. The pump is controlled by a conventional pressure-sensing switch 11 connected to a water tank 12. As illustrated, the tank contains water 15, the approximate upper level of which is maintained at 16 and also contains air 17. Water is supplied from the tank 12 by means of an output line 20 which leads to the various fixtures in the house or the like.

Figure 2:
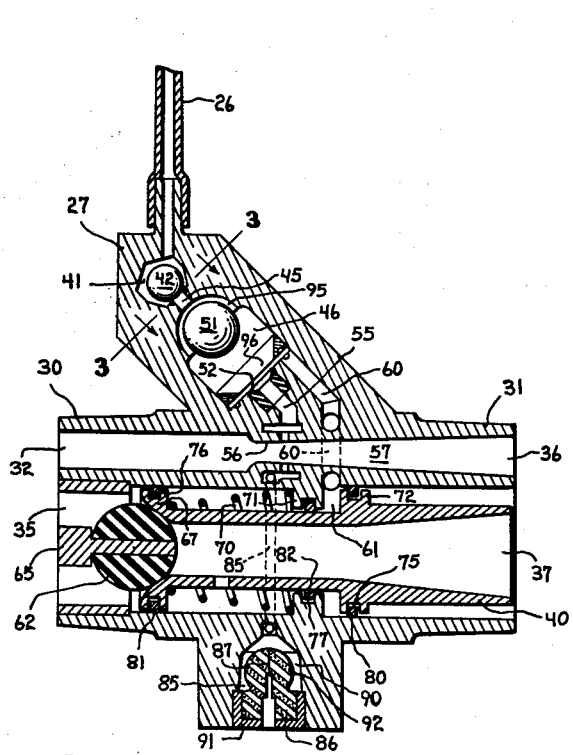
FIG. 2 is a vertical section through a control forming a part of the system of FIG. 1.

The pump 10 is connected to a suitable well or water source by a conduit 21 and is connected to the tank through conduits 22 and 23, the control 25 of the present invention being connected in series with the conduits 22 and 23. A water level-sensing line 26 is connected to the top of the control housing 27 and opens into the tank at the desired water level. Referring to FIG. 2, it should be noted that the conduits 22 and 23 are received about the cylindrical portions 30 and 31, respectively, of the control housing 27. Thus, any water pumped into the control through the conduit 22 can enter into jet channel entrance 32 or the main control conduit 35. Also any water moving out of the control can enter the conduit 23 from the jet channel exit 36 or from the water passage 37 through the piston 40.

Figure 3:
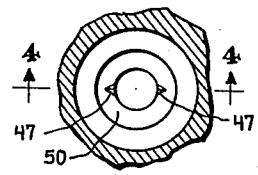
FIG. 3 is a section taken along line 3—3 of FIG. 2 in the direction of the arrows.
Figure 4:
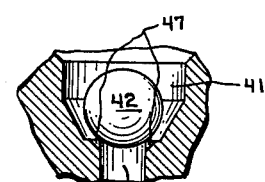
FIG. 4 is a section taken along the line 4—4 of FIG. 3 in the direction of the arrows.

Formed within the control housing 27 is a check-ball chamber 41 which opens into the sensing line 26 and receives a check-ball 42. A passage 45 leads from the check-ball chamber 41 into a float ball chamber 46 also formed within the housing 27. A pair of notches 47 (FIG. 3) are formed in a seat 50 against which the check ball 42 may move to control flow through the passage 45 from the check ball chamber 41. Thus, it can be appreciated that even though the check-ball is engaged with the seat 50, there will be a small amount of flow from the check-ball chamber through the notches 47 into the passage 45. It should be noted that the seat 50 is tilted at an angle to the horizontal whereby ball 42 falls off the seat when there is no water in chamber 41. When water flows through line 26 there is a short interval of time before ball 42 seats on the seat 50, and during this interval of time any accumulated iron or sludge or any other foreign material is washed away from the seat and orifice 45 thereby to clean the seat and the orifice during each pumping cycle. Thus, there is provided a self-cleaning seat and orifice. A float ball 51 is received in the float ball cavity 46 and is movable downwardly within the cavity to and against a seat 52 to control flow from the float ball cavity into a passage 55 leading from the float ball cavity to the necked-down portion 56 of the jet water channel or passage 57 within the housing. A further passage 60 leads from the float ball chamber 46 to a piston control chamber 61.

As mentioned, the main water passage into the control is the passage 35. A stationary piston seat ball 62 is mounted fixedly within the passage 35 by means of mounting element 65, only a portion of which is shown. Reciprocably mounted for longitudinal movement within the passage 35 is a piston unit 40 which is generally annular in shape and has a flaring end portion forming an upstream piston 67 adapted to be forced into sealing engagement with the piston seat ball by means of a spring 70 received about the piston unit and acting between the upstream piston 67 and an annular inwardly projecting flange 71 integral with the housing.

Also formed upon the piston unit 40 is an outwardly projecting annular flange forming a downstream piston 72 having an outwardly facing slot 75 therein. The piston 67 and the annular inwardly projecting portion 71 also have annular slots 76 and 77, respectively, formed therein. Each of the slots 75, 76 and 77 receives a sealing ring which are respectively, the downstream sealing ring 80, the upstream sealing ring 81 and the shaft sealing ring 82.

In order for the air control to work properly, it is necessary that there be very low friction created by the sealing rings. For this reason, these rings are composed of a material such as low density polyethelene. The rings are sized to the housing and the piston so as to obtain low friction. It is to be noted that slots 75, 76 and 77 are slightly oversize in respect to the rings, the purpose being to provide differential pressures on the rings to enhance sealing.

A passage 85 is formed in the housing 27 and leads into the necked-down portion 56 of the jet channel 57. Mounted within the passage 85 is a check valve 86 which comprises a rubber or the like element having a normally closed slit 87 cut therethrough. This check valve is mounted within an enlarged ball portion 90 in the passage 85 by means of a retainer 91. When the pressure within the passage 85 is less than the outside pressure, the shape of the check valve 86 permits deformation of the ball portion 92 so that air can pass through the normally closed slit 87. When the pressure within the chamber 90 is greater than outside pressure, slit 87 is forced into closed position and no air passes.

The device operates as follows. The pump 10 is started when the pressure within the tank 12 falls below a predetermined value. Water is pumped from the well to the control 25 by the pump. Assume that the water within the tank covers the tube 26. Piston 40 is normally pushed into engagement with ball 62 by spring 70 while the pump is idle. For water to pass through the main control passage 35, the piston 40 must move away from the piston seat ball 62 so that water can pass through the piston passage 37. When the pump starts, a differential pressure is formed across the piston 40. This differential pressure is, of course, also across the jet passage 57. Flow through the jet creates a pressure in the piston control chamber 61 which is lower than the pressure downstream of the piston in the conduit 23.

When the pressure within the piston chamber 61 goes below zero p.s.i.g., the check valve 86 opens, permitting air to flow through the passage 85 and to be entrained within the water passing through the jet. In order that the control may operate with pumps of different capacities, the piston unit is designed to throttle the flow of water through passage 37 in accordance with pressures created upstream and downstream of the control. For example, when the jet starts to suck air, the pressure in chamber 61 becomes substantially zero. The pressure downstream of piston 72 is tank pressure, $P_2$. Pressure $P_2$ acting against piston 72 and zero pressure in chamber 61 creates a force $F_1$ acting to push unit 40 toward engagement with ball 62. The piston unit then adjusts itself until the clearance between the piston unit and ball 62 is such that the pump flow is throttled until a pump pressure $P_1$ creates a force $F_2$ on piston 67 equal and opposite to the force $F_1$. Thus, regardless of the capacity of the pump, the upstream and downstream forces $F_1$ and $F_2$ are equalized. Furthermore, different pump capacities do not prevent the jet from operating efficiently.

The ratio of pressure $P_1$ to $P_2$ can be determined by the design of the control so that equalization of the forces $F_1$ and $F_2$ will occur. Forces $F_1$ and $F_2$ across the pistons are proportional to the areas of the respective pistons 67 and 72. Thus, these areas can be chosen to make $P_2$ a certain percent of $P_1$ in accordance with the following formula:

$$(P_1-P_2)A_1 = P_2 A_2$$

$$P_1 - P_2 = P_2 \frac{A_2}{A_1} = \frac{P_2}{R}$$

$A_1$ = area of piston 67
$A_2$ = area of piston 72
$P_1$ = pump pressure
$P_2$ = tank pressure $$P_1 = P_2 - \frac{P_2}{R} = P_2\left(1 - \frac{1}{R}\right)$$

$$R = \text{ratio} = \frac{A_1}{A_2}$$

$$P_1 = \frac{P_2}{K}$$

$$P_2 = KP_1$$

$$K = \frac{1}{\left(1 - \frac{1}{R}\right)}$$

The foregoing formula is simplified in that it does not include the effects of friction. There are two types of friction, static friction, $F_s$, which occurs when there is no pressure differential across the control, and friction, $F_p$, which occurs when there is a pressure differential across the control. For the ratio of $P_2$ to $P_1$ to remain substantially constant, the second type of friction $F_p$ must be much larger than the friction $F_s$ and the friction must be nearly proportional to pressure $P_1$. Friction always resists the direction of motion and therefore, it will tend to increase $P_1$ when piston unit 40 is trying to move away from ball 62 and will decrease $P_1$ when the piston unit 40 is trying to move into engagement with ball 62. If the above conditions are met, the formula governing the ratio of $P_1$ to $P_2$ is as follows:

$$A_1(P_1-P_2) = P_2 A_2 \pm F_p \pm F_s = P_2 A_2 \pm \gamma P_1 \pm F_s$$

Friction force = $\gamma P_1$ $$P_1 - P_2 = P_2 \frac{A_2}{A_1} \pm \frac{\gamma P_1}{A_1} + \frac{F_s}{A_1}$$

$$P_1 = P_2\left(1 - \frac{1}{R}\right) \pm DP_1 \pm B$$

$$P(1 \mp D) = P_2\left(1 - \frac{1}{R}\right) \pm B$$

$$P_2 = \frac{(1 \mp D)}{\left(1 - \frac{1}{R}\right)} P_1 \mp B$$

$$B = \frac{F_s}{A_1} = \text{constant}$$

$$D = \frac{\gamma}{A} = \text{constant}$$

$$E = \frac{1+D}{1-\frac{1}{R}}$$

$P_2 = EP_1 + B$ on rising pressure $$F = \frac{1-D}{1-\frac{1}{R}}$$

$P_2 = FP_1 - B$ on falling pressure

An additional important principle is incorporated in the foregoing formula. For $P_2$ to be a constant portion of $P_1$, the friction of each sealing ring must be proportional to the pressure difference across each ring. This is accomplished by using a material with a consistent coefficient of friction and allowing the pressure to push the ring against the cylinder wall. It will be noted that each sealing ring is spaced outwardly of the floor of its slot. This permits fluid pressure to exert force radially outwardly against the inner surface of each ring. Thus, the force of friction varies with the pressure differential according to the following formula:

$$F_f = \mu P W \pi = \gamma P$$

$\mu$ = coefficient of friction
$P$ = pressure differential across the sealing ring
$W$ = width of the ring
$D$ = diameter of the ring Entrainment of air continues during a single pumping cycle or during several cycles until sufficient air has been pumped into the tank 15 to lower the water level 16 below the tube 26. Obviously, it may be necessary to withdraw water through the conduit 20 for the water level to drop below the tube 26 but even so, it can be appreciated that the air being added to the tank will increase the amount of air therein.

Of course, as the pressure within the tank reaches a predetermined value before the water level drops below the tube 26, the pump will shut off. However, as long as the pump is running and the water covers the tube 26, the control will operate to suck air through the check valve 86 and to add this air to the tank.

As long as the tube 26 is covered by water, a differential pressure is maintained between the check ball chamber 41 and the float ball chamber 46 by means of the check ball 42 engaging the seat 50. The leakage through the notches 47 is much below the capacity of the jet so that the pressure in the float ball chamber and piston control chamber 46 and 61, respectively, will be maintained at zero or lower p.s.i.g. when the check ball chamber 41 is at tank pressure.

At the time the pump is started and when the air volume within the tank is sufficient to maintain the water level 16 below the tube 26, the notched seat 50 will be exposed to air through the tube 26. Thus, air instead of water will pass through the passage 45. The pressure in the float ball chamber 46 and piston control chamber 61 will increase but not to tank pressure. Thus, a lesser differential pressure would be maintained across the jet and the jet will suck air from the tank. The float ball 51, however, drops onto its seat 52 and cuts off flow between the chamber 46 and the passage 55. Thus, no air can pass from the chamber 46 into the jet of water and air cannot be recirculated from the tank. Also, the pressure in the piston control chamber 61 becomes tank pressure (the same as the pressure in chamber 46) and the differential across the control and between the conduits 22 and 23 drops to friction loss.

The pressure within the chamber 61 rising to tank pressure causes the piston to be forced away from the ball 62 and water flows through the channel 37. The pressure within the entrance 32 of the jet reduces sufficiently so that the pressure in the passage 85 rises above zero p.s.i. and the check valve 92 closes. Thus, air is not pumped into the tank as long as water in the tank is below the tube 26.

It should be understood that the float ball 51 will drop to the seat 52 only when exposed to air. By making the shape of the float ball chamber 46 the same at its upper end 95 as the shape of the float ball 51, Bernoulli's principle can be used to keep the float ball at the upper end of the float ball chamber when water fills the chamber. In other words, the high velocity flow around the float ball reduces the static pressure and pulls the ball upwardly into the spherical portion 95 of the float ball chamber. Baffle 96 is arranged in chamber 46 to interrupt flow of water from passage 60 into chamber 46. Thus, if the sealing rings should wear sufficiently to permit water to spurt against ball 51, the baffle deflects the water back to passage 55 and prevents the static pressure from changing so that ball 51 would drop.

The piston return spring 70 is of slightly greater strength than the combined frictional forces of the three sealing rings 80, 81 and 82. Thus, the piston will be returned against the ball 62 when the pump shuts off and the pressure equalizes on opposite sides of the control.

From the above description, it will be appreciated that the present invention provides an improved control for hydropneumatic system, said control being relatively simple and inexpensive and yet efficient in operation.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

1. In a water supply system, a tank, a pump for supplying water to said tank, means controlled by the pressure in said tank for starting and stopping said pump, a fluid tight housing connected between said tank and said pump, a sensing tube connected to said tank at the desired water level, a check valve mounted in said housing and opening to atmosphere, said housing having a venturi passage therethrough communicating between said pump and said tank, and a second passage therethrough communicating between said venturi passage and said check valve, and valve means coupled to said sensing tube and said venturi passage for controlling said check valve to admit air to said venturi passage when tank water is above the desired level and to shut off said check valve when tank water is below the desired level.

2. A control comprising a housing having a main water channel therethrough and a necked-down jet channel therethrough, a piston within said main channel operable to close off flow therethrough, a check valve mounted within said housing, said housing having a passage leading from said check valve to the necked-down portion of said jet, said housing having a further passage leading to said piston, said piston and further passage being formed to provide means responsive to the pressure within said further passage for controlling the position of said piston, and means responsive to the presence of water for controlling the pressure within said further passage.

3. In a water supply system, a tank, a pump for supplying water to said tank, means controlled by the pressure in said tank for starting and stopping said pump, a fluid tight housing connected between said tank and said pump, said housing having a main water channel therethrough and a necked-down jet channel therethrough, a piston within said main channel operable to close off flow therethrough, a sensing tube connected to said tank at the desired water level, a check valve mounted in said housing, said housing having a passage leading from said check valve to the necked-down portion of said jet, said sensing tube including means for controlling the position of said piston to cut down flow in said main channel when tank water is above the desired level and to permit flow through said main channel when tank water is below the desired level.

4. In a water supply system, a tank, a pump for supplying water to said tank, means controlled by the pressure in said tank for starting and stopping said pump, a fluid tight housing connected between said tank and said pump, said housing having a main water channel therethrough and a necked-down jet channel therethrough, a hollow annular piston coaxially received in said main channel and reciprocal longitudinally thereof, a ball fixedly mounted in said main channel upstream of said piston, resilient means urging said piston into contact with said ball to cut down flow through said main channel, a check valve mounted in said housing and communicating with atmosphere, said housing having a first passage leading from said check valve to the necked-down portion of said jet, said check valve being operable to permit flow from atmosphere into said first passage but to block flow from said first passage to atmosphere, said housing having formed therein a check-ball chamber and a float ball chamber and a connecting orifice therebetween a check-ball within said check-ball chamber, a float ball within said float ball chamber, the opening of said orifice into said check-ball chamber being sufficiently small to permit seating of said check-ball therein, said housing having a second passage formed therein leading from said float ball chamber and including a portion located upstream of a portion of said piston, said housing and piston being formed to provide means for applying pressure within said second passage on only the upstream side of said piston, said housing having a third passage leading from the lower side of said float ball chamber to the necked-down portion of said jet, said sensing tube being connected to said housing and leading into said check-ball chamber, the opening of said orifice into said check-ball chamber being notched to permit flow from said check-ball chamber into said orifice even though said check-ball is seated in said opening, said float ball being adapted to close off said third passage when air is contained within said float ball chamber.

5. In a water supply system, a tank, a pump for supplying water to said tank, means controlled by the pressure in said tank for starting and stopping said pump, a fluid tight housing connected between said tank and said pump, said housing having a main water channel therethrough and a necked-down jet channel therethrough of reduced diameter relative to said main channel, a hollow annular piston coaxially received in said main channel and reciprocal longitudinally thereof, seals received between said piston and the wall of said main channel and preventing flow therebetween, a ball fixedly mounted in said main channel upstream of said piston, resilient means urging said piston into contact with said ball to cut down flow through said main channel, a check valve mounted in said housing and communicating with atmosphere, said housing having a first passage leading from said check valve to the necked-down portion of said jet, said check valve being operable to permit flow from atmosphere into said first passage but to block flow from said first passage to atmosphere, said housing having formed therein a check-ball chamber and a float-ball chamber and a connecting orifice therebetween, a check-ball within said check-ball chamber, a float-ball within said float-ball chamber, the opening of said orifice into said check-ball chamber being sufficiently small to permit seating of said check-ball therein, said housing having notches at said opening by passing said check-ball when seated, said housing having a second passage formed therein leading from said float-ball chamber and including a portion located upstream of a portion of said piston, said housing and piston being formed to provide means for applying pressure within said second passage on only the upstream side of said piston, said housing having a third passage leading from the lower side of said float-ball chamber to the necked-down portion of said jet, said sensing tube being connected to said housing and leading into said check-ball chamber, the opening of said orifice into said check-ball chamber being notched to permit flow from said check-ball chamber into said orifice even though said check-ball is seated in said opening, said float-ball being adapted to close off said third passage when air is contained within said float-ball chamber.

6. A control comprising a housing having a main water channel therethrough and a necked-down jet channel therethrough of reduced diameter relative to said main channel, a hollow annular piston coaxially received in said main channel and reciprocal longitudinally thereof, a ball fixedly mounted in said main channel upstream of said piston, resilient means urging said piston into contact with said ball to cut down flow through said main channel, a check valve mounted in said housing and communicating with atmosphere, said housing having a first passage leading from said check valve to the necked-down portion of said jet, said check valve being operable to permit flow from atmosphere into said first passage but to block flow from said first passage to atmosphere, said housing having formed therein a check ball chamber and a float ball chamber and a connecting orifice therebetween, a check ball within said check ball chamber, a float ball within said float ball chamber, the opening of said orifice into said check ball chamber being sufficiently small to permit seating of said check ball therein, said housing having a second passage formed therein leading from said float ball chamber and including a portion located upstream of said piston, said housing and piston being formed to provide means for applying pressure within said second passage on only the upstream side of said piston, said housing having a third passage leading from the lower side of said float ball chamber to the necked-down portion of said jet, the opening of said orifice into said check ball chamber being notched to permit flow from said check ball chamber into said orifice even though said check ball is seated in said opening, said float ball being adapted to close off said third passage when air is contained within said float ball chamber.

7. In a water supply system, a tank, a pump for supplying water to said tank, means controlled by the pressure in said tank for starting and stopping said pump, a fluid tight housing connected between said tank and said pump, said housing having a main water channel therethrough and a necked-down jet channel therethrough, a piston within said main channel operable to cut down flow therethrough, a sensing tube connected to said tank at the desired water level and arranged to receive water when the water level is too high and air when the water level is too low, said housing having a passage communicating between said tube and said piston, said passage and piston being formed to provide means responsive to the pressure within said passage for controlling the opening and closing of said piston, means for adding air to the water within said jet channel, and means responsive to the presence of water within said sensing tube for controlling the pressure within said passage.

8. In a water supply system, a tank, a pump for supplying water to said tank, means controlled by the pressure within said tank for starting and stopping said pump, a fluid tight housing connected between said tank and said pump, means for adding air to said water passing through said housing, a piston within said housing operable to control said air adding means, and means responsive to the level of water within said tank for controlling said piston.

9. In a water supply system, a tank, a pump for supplying water to said tank, means controlled by the pressure in said tank for starting and stopping said pump, a fluid tight housing connected between said tank and said pump, said housing having a main water channel therethrough and a necked-down jet channel therethrough, a hollow annular piston coaxially received in said main channel and reciprocal longitudinally thereof, a ball fixedly mounted in said main channel upstream of said piston, resilient means urging said piston into contact wtih said ball to cut down flow through said main channel, a check valve mounted in said housing and communicating with atmosphere, said housing having a first passage leading from said check valve to the necked-down portion of said jet, said check valve being operable to permit flow from atmosphere into said first passage but to block flow from said first passage to atmosphere, and means responsive to the level of water within said tank for providing a pressure differential across said piston for the moving thereof away from said ball against the urging of said resilient means.

References Cited in the file of this patent

UNITED STATES PATENTS

| | | |
|---|---|---|
| 2,685,297 | Clearman | Aug. 3, 1954 |
| 2,708,881 | Carpenter | May 24, 1955 |
| 2,839,001 | Tubbs | June 17, 1958 |
| 2,873,758 | Nielsen | Feb. 17, 1959 |